C. W. WINTERBOTHAM.
ELECTRIC HOT WATER STORAGE INSTALLATION.
APPLICATION FILED JULY 3, 1915.
1,188,520.
Patented June 27, 1916.
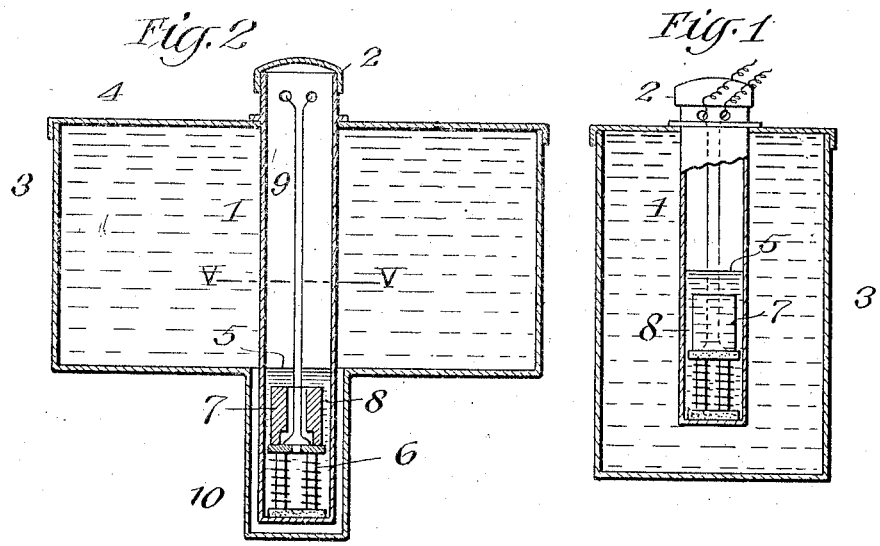
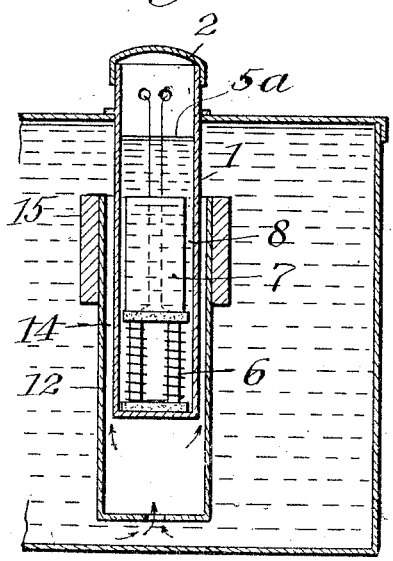
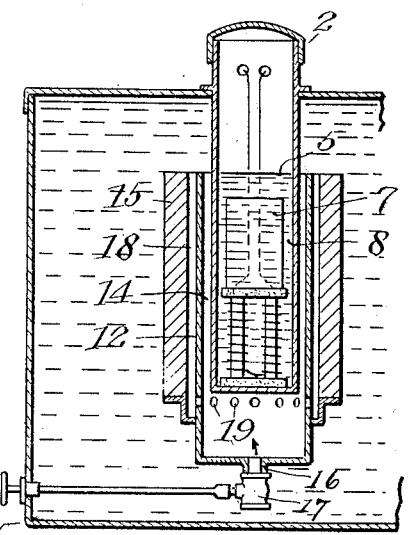
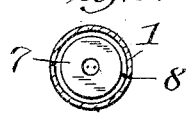
INVENTOR
C. W. WINTERBOTHAM.
BY
Ebenezer Marks
ATTORNEY

UNITED STATES PATENT OFFICE.

CLIFFORD WILLIAM WINTERBOTHAM, OF BRIGHTON BEACH, NEAR MELBOURNE, VICTORIA, AUSTRALIA, ASSIGNOR TO FRED WALKER, OF MELBOURNE, AUSTRALIA.

ELECTRIC HOT-WATER-STORAGE INSTALLATION.

1,188,520.

Specification of Letters Patent. Patented June 27, 1916.

Application filed July 3, 1915. Serial No. 37,996.

*To all whom it may concern:*

Be it known that I, CLIFFORD WILLIAM WINTERBOTHAM, a subject of the King of Great Britain, residing at 107 South road, Brighton Beach, near Melbourne, in the State of Victoria, Australia, engineer, have invented Improvements Relating to Electric Hot-Water-Storage Installations, of which the following is a specification.

This invention relates to the heating, circulation and storage of water in an electrical hot water storage installation and includes means by which the water may be heated to different temperatures without necessarily varying the strength of the electric current and also improvements in and relating to the electric heating unit whereby simplicity of construction and high efficiency is obtained, removal, renewal or alteration of the heating unit is facilitated and effective utilization of varying heats produced in the element is obtained.

Briefly stated the invention comprises an electrical heating unit within or adjacent to a vessel or tank arranged in such a manner that water or other liquid may be either circulated from the bottom to top of the vessel or tank, or only through the upper strata thereof, or through the body of water below the hottest strata or the strata of water on the upper part of the vessel may be heated or boiled.

The heating element moreover may be adapted to be placed in a vessel or cup containing oil or the like and let down into the storage vessel or tank so that removal, renewal or alteration of the said unit is facilitated.

Some exemplifications of the invention are illustrated in the accompanying drawings in which—

Figures 1, 2, 3 and 4 are similar vertical sections taken through the apparatus, with some part broken or in elevation, and illustrating various exemplifications of the invention. Fig. 5 is a section on line V—V of Fig. 2.

According to this invention a cup 1 of suitable shape provided with a removable cap 2, is let down part way into the vessel or urn 3 from the fixed or detachable cover 4 thereof to which it is attached and sealed. This cup is adapted to contain an electric insulating medium such as oil 5, and is so fixed that the oil will not spill. The electric heating unit 6 is located in this cup, and the height of the oil in said cup will vary according to the purpose for which the unit is being used.

The heating element comprises electric resistance material such as nichrome or German silver wire suitably mounted so as to be perfectly insulated from said cup. In the latter sufficient space is left for the expansion of the oil and a central baffle 7, of such construction as to cause the circulating hot oil to come in contact with the sides of said cup which is surrounded by water, may be fitted inside the cup above the heating unit. The diameter of the baffle is less than that of the cup so that a narrow passage 8 is provided for the circulation of the oil. The electric conducting wires 9 may lead in to the heating element through the upper part of the cup which may extend above the top of the water vessel 3.

In the most simplified application of the device the cup containing the heating unit extends to the lower part of the vessel as in Fig. 1, or down into a well 10 formed in the vessel as in Fig. 2 which well is of slightly greater diameter than the cup, so that a narrow water passage 11 is formed between the cup and inner surface of the well.

According to the construction shown in Fig. 3 a thin open ended sheath 12 is provided in the vessel around the cup, such sheath being of such a diameter as to provide a narrow space between the cup and said sheath forming an up-flow passage 14 which may extend from near the top to near the bottom of the water vessel. This sheath may be surrounded by a wall of non-heating conducting material 15 which is in contact therewith, and extends approximately the full length of the sheath or only about that upper part of its length which surrounds the heating element or the baffle therein and said sheath is open at the top and bottom to allow circulation of the water throughout the vessel on a low heat. In this form of the invention a comparatively large body of oil $5^a$ is provided above the baffle 7 *i. e.* the level of the oil is near the top of the cup. The construction shown in Fig. 3 is adapted for a high heat as well as a low, the high heat being used for heating mainly the upper strata of the water in the vessel or boiling same. When a low heat is on, the hot oil rising upwardly has most of its heat absorbed by the water before it comes to the unprotected portion of the cup above the insulated wall 15 and this water rising is displaced by water coming from the bottom whereby circulation takes place all through the vessel. When high heat is on however, the oil does not lose all its heat by the time it has come to the top but the hottest oil on top heats only the top strata of the water which will eventually boil. Moreover the oil also rises with the higher heat due to expansion.

In order to circulate the water through the upper strata or through the body of water below the hottest strata when using only a constant heat, the water inlet end of the sheath (Fig. 4) which preferably extends to the lower part of the vessel, may terminate with a pipe 16 as illustrated adapted to be closed by a cock 17 or otherwise, and the wall 15 is somewhat increased in diameter with relation to the sheath so as to form a down-flow water passage 18, between said wall and sheath which passage is closed at the bottom, but connected with the passage 14 by apertures 19 in said sheath. Said passages 14 and 18 are thus in communication at the top and bottom so that the water may circulate therethrough when the cock 17 is closed.

The construction just described is applicable to low heat only and the operation is as follows:—When the cock 17 is open, water circulates from the bottom of the vessel through the sheath to the top of the vessel, and, when the cock is closed, through the passages 14 and 18 thus circulating only the upper strata of the water in the vessel.

The wall 15 is not necessarily a non-heat-conducting wall, but is preferably so, as it will thus prevent the heat from spreading outward into the lower body of water while circulation is taking place.

It will be understood that by removing the cap of the cup the heating element with the baffle may be lifted out of the latter so that renewal or alteration is facilitated in an expeditious manner. Further when the apparatus is used for circulating water suitable means are employed in maintaining the supply of water in the vessel as quantities are drawn off.

I claim:—

1. An electric water-heating apparatus comprising a vessel containing water, a closed cup extending downwardly into said vessel from the top thereof, an electric heating element arranged in the lower part of said cup, a liquid partially filling said cup and having the properties of a heat conductor and an electric insulator, and a baffle, arranged above said heating element, adapted to leave a comparatively small space between its edge and the inside of the cup for the passage of said liquid.

2. An electric water-heating apparatus comprising a vessel containing water, a closed cup extending downwardly into said vessel from the top thereof, an electric heating element arranged in the lower part of said cup, a liquid partially filling said cup and having the properties of a heat conductor and an electric insulator, a baffle arranged above said heating element, adapted to leave a comparatively small space between its edge and the inside of the cup for the passage of said liquid, and means to heat only the upper strata of the water in said vessel.

3. An electric water-heating apparatus comprising a vessel containing water, a closed cup extending downwardly into said vessel from the top thereof, an electric heating element arranged in the lower part of said cup, a liquid partially filling said cup and having the properties of a heat conductor and an electric insulator, a baffle, arranged above said heating element, adapted to leave a comparatively small space between its edge and the inside of the cup for the passage of said liquid, and an open ended sheath around said cup forming a narrow water passage between said sheath and cup.

4. An electric water-heating apparatus comprising a vessel containing water, a closed cup extending downwardly into said vessel from the top thereof, an electric heating element arranged in the lower part of said cup, a liquid partially filling said cup and having the properties of a heat conductor and an electric insulator, a baffle, arranged above said heating element, adapted to leave a comparatively small space between its edge and the inside of the cup for the passage of said liquid, and a sheath, open at both ends, arranged around said cup to form a narrow water passage between said sheath and cup.

5. An electric water-heating apparatus comprising a vessel containing water, a closed cup extending downwardly into said vessel from the top thereof, an electric heating element arranged in the lower part of said cup, a liquid partially filling said cup and having the properties of a heat conductor and an electric insulator, a baffle, arranged above said heating element, adapted to leave a comparatively small space between its edge and the inside of the cup for the passage of said liquid, a sheath, open at both ends, arranged around said cup to form a narrow water passage between said sheath and cup, and means for closing the opening at the lower end of the sheath.

6. An electric water-heating apparatus comprising a vessel containing water, a closed cup extending downwardly into said vessel from the top thereof, an electric heating element arranged in the lower part of said cup, a liquid partially filling said cup and having the properties of a heat conductor and an electric insulator, a baffle, arranged above said heating element, adapted to leave a comparatively small space between its edge and the inside of the cup for the passage of said liquid, a sheath, having openings at its top and bottom ends, arranged around said cup to form a narrow passage for the upflow of water between said sheath and cup, a non-heat-conducting wall around said sheath and spaced therefrom to form a passage for the downflow of water between said sheath and wall, means closing the lower end of the downflow passage against communication with said vessel, means for connecting said passages at their lower ends, and means for closing, at will, the opening at the bottom end of said sheath.

Signed at Melbourne, in the State of Victoria, Australia, this fourth day of June, 1915.

CLIFFORD WILLIAM WINTERBOTHAM.